D. Daltry,
Rod Coupling.
No. 56,849. Patented July 31, 1866.

Witnesses:
Wm. Albert Steel
John Parker

Inventor:
D. Daltry
By his Atty

UNITED STATES PATENT OFFICE.

DAVID DALTRY, OF PHILADELPHIA, PENNSYLVANIA, ASSIGNOR TO HIMSELF AND JOHN PARKER, OF THE SAME PLACE.

IMPROVED ROD-COUPLING.

Specification forming part of Letters Patent No. 56,849, dated July 31, 1866; antedated July 13, 1866.

*To all whom it may concern:*

Be it known that I, D. DALTRY, of Philadelphia, Pennsylvania, have invented an Improved Coupling for Tubes, &c.; and I do hereby declare the following to be a full, clear, and exact description of the same, reference being had to the accompanying drawings and to the letters of reference marked thereon.

My invention consists of a mode, fully described hereinafter, of so coupling together tubes or rods that the connections may remain perfectly secure, no matter what shocks or jars the said tubes or rods may be subjected to.

In order to enable others to make and use my invention, I will now proceed to describe its construction and operation.

Figure 1:
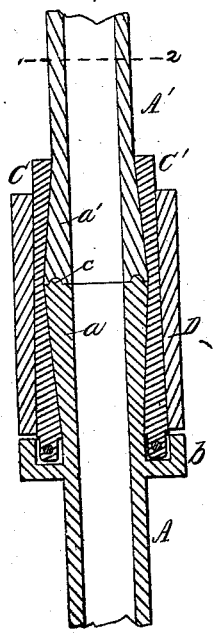
Figure 2:
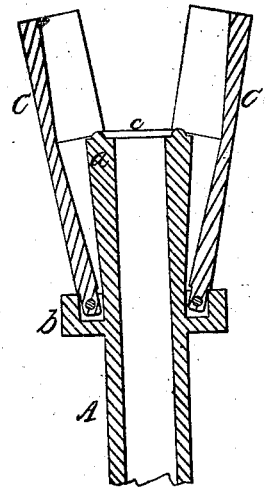
Figure 3:
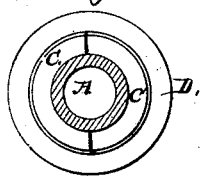

On reference to the accompanying drawings, which form a part of this specification, Figure 1 is a sectional view, showing the ends of two tubes with my improved coupling; Fig. 2, a section of one of the tubes and part of the coupling; and Fig. 3, a sectional plan view on the line 1 2, Fig. 1.

Similar letters refer to similar parts throughout the several views.

A is one end of one tube, on which a tapering enlargement, $a$, is formed, a similar enlargement, $a'$, being formed on the end of the adjacent tube, A′, and on the enlarged end of tube A is an annular projection adapted to an annular recess in the end of the tube A′. To the collar $b$ on the tube A are hinged two clamp-pieces, C C′, which, when together, form a tapering tube, smallest at the top, the clamp-pieces being adapted internally to the enlarged and tapering ends of both tubes A A′, as shown in the drawings. To the clamp-pieces C C′ is fitted a sleeve, D, which corresponds internally with the tapering exteriors of the two clamp-pieces.

The ordinary screw-couplings used for connecting the tubes of well-boring apparatus together are objectionable, as the threads of the screws soon become worn, and in many cases stripped—accidents which result in tedious and expensive delay.

When the tubes A A′, above described, are to be coupled, the clamps C C′ are turned out, as shown in Fig. 2. The end of the tube A′ is placed against the end of the tube A, the annular projection of the latter fitting in the recess of the former. The two clamps are now brought against the enlargement of the two tubes, and the sleeve D is forced down over the clamps to the position shown in Fig. 1. The tubes can be thus connected in much less time than by the ordinary screw-coupling, and cannot be separated without first removing the sleeve.

The jarring of the tubes caused in boring by the drill striking the rock can have no other effect than that of tightening the coupling.

It will be apparent that this coupling may be applied to solid rods.

I claim as my invention and desire to secure by Letters Patent—

The combination of the tapering enlargements $a$ $a'$ of the two tubes, the clamp-pieces C and C′, and the sleeve D, the whole being constructed substantially as and for the purpose specified.

In testimony whereof I have signed my name to this specification in the presence of two subscribing witnesses.

DAVID DALTRY.

Witnesses:
CHARLES E. FOSTER,
W. W. DOUGHERTY.